United States Patent
Chen et al.

(10) Patent No.: US 11,873,368 B2
(45) Date of Patent: Jan. 16, 2024

(54) TWO COMPONENT (2K) COMPOSITION BASED ON MODIFIED EPOXY RESIN

(71) Applicant: Henkel AG & Co. KGaA, Duesseldorf (DE)

(72) Inventors: Chunfu Chen, Kanagawa (JP); Leo Li, Shanghai (CN); Chao Wang, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 116 days.

(21) Appl. No.: 17/493,582

(22) Filed: Oct. 4, 2021

(65) Prior Publication Data

US 2022/0025105 A1 Jan. 27, 2022

Related U.S. Application Data

(63) Continuation of application No. PCT/CN2019/081238, filed on Apr. 3, 2019.

(51) Int. Cl.
| | |
|---|---|
| *C08G 59/22* | (2006.01) |
| *C08G 59/24* | (2006.01) |
| *C08G 59/28* | (2006.01) |
| *C08G 59/44* | (2006.01) |
| *C08G 59/14* | (2006.01) |
| *C08G 59/40* | (2006.01) |
| *C08L 63/00* | (2006.01) |

(52) U.S. Cl.
CPC ......... *C08G 59/226* (2013.01); *C08G 59/245* (2013.01); *C08G 59/28* (2013.01); *C08G 59/44* (2013.01)

(58) Field of Classification Search
None
See application file for complete search history.

(56) References Cited

U.S. PATENT DOCUMENTS

| 5,575,956 A * | 11/1996 | Hermansen ............... H01B 1/22 |
| | | 252/514 |
| 6,420,496 B1 | 7/2002 | Moon et al. |
| 2005/0143496 A1 | 6/2005 | Mueller |
| 2013/0255879 A1* | 10/2013 | Bieber ................. C08G 59/186 |
| | | 523/400 |
| 2015/0284608 A1* | 10/2015 | Hofstetter ................ C08K 3/36 |
| | | 252/182.14 |
| 2017/0107409 A1* | 4/2017 | Harrington ............ C08G 59/20 |
| 2017/0321094 A1 | 11/2017 | Holtgrewe et al. |

FOREIGN PATENT DOCUMENTS

| CN | 101287794 | 10/2008 |
| CN | 103270073 | 8/2013 |
| CN | 108699419 | 10/2018 |

OTHER PUBLICATIONS

International Search Report issued in connection with International Patent Application No. PCT/CN2019/081238 dated Jan. 6, 2020.

\* cited by examiner

*Primary Examiner* — Randy P Gulakowski
*Assistant Examiner* — Ha S Nguyen
(74) *Attorney, Agent, or Firm* — Steven C. Bauman

(57) ABSTRACT

The present invention is directed to a two component (2K) composition comprising:
(A) a first component comprising:
 a) at least one elastomer modified epoxy resin;
 b) at least one internally flexibilized epoxy resin which is characterized by a Shore D hardness, as measured with a durometer in accordance with ASTM D2240, of ≤45 when cured with diethylene triamine;
 c) at least one chelate modified epoxy resin; and
 d) optionally at least one epoxy resin different from said resins a) to c); and,
(B) a second component comprising:
 e) a curative which consists of at least one compound possessing at least two epoxide reactive groups per molecule, said curative being characterized by comprising at least one Mannich base.

14 Claims, No Drawings

TWO COMPONENT (2K) COMPOSITION BASED ON MODIFIED EPOXY RESIN

FIELD OF THE INVENTION

The present invention is directed to a two component (2K) composition based on modified epoxy resins. More particularly, the present invention is directed to a two component (2K) composition comprising, as a first component, a combination of modified epoxy resins and, as a second component, a curative comprising a Mannich base: the reaction of the two components of said composition provides a flexible, cured product.

BACKGROUND TO THE INVENTION

Epoxy resins have found a broad range of application, predominantly on the basis that a particular selection of resin, modifier and cross-linking agent (or curative) can allow the properties of the cured epoxy resin to be tailored to achieve specific performance characteristics.

That versatility being acknowledged, properly cured epoxy resins also possess a plurality of other attributes including inter alia: excellent chemical resistance, particularly to alkaline environments; high tensile and compressive strengths; high fatigue strength; low shrinkage upon cure; ability to cure over a range of temperatures; and electrical insulation properties and retention thereof upon aging or environmental exposure.

The present inventors have however recognized that epoxy resins have found somewhat limited utility in applications where said resins must adhere to metallic substrates which have previously been exposed to contaminants associated with industrial manufacture, and in particular to oil and grease. In addition, epoxy resins have found somewhat limited utility as structural adhesives or sealants where the components to be adhered or sealed are jointed or seamed and/or must show flexural movement: the imposition of the requirement of flexibility on the adhesive or sealant for such components has heretofore stymied the use of epoxy resins which are often rigid and inflexible upon cure.

The skilled artisan will recognize that metallic substrates and components of the aforementioned type are particularly common in vehicle manufacture and repair. And the art associated with the epoxy resins being used in this technical field is considered to be limited and deficient.

US 2017/0321094 (Holtgrewe et al.) describes adhesive compositions comprising a pre-polymer which can be obtained by reacting a reaction mixture containing: at least one epoxy resin; at least one polyetherdiamine or polyethertriamine; at least one carboxyl-terminated butadiene-acrylonitrile copolymer (CTBN); and, rubber particles having a core/shell structure.

US 2005/0143496 (Mueller) discloses a two-component epoxide resin composition comprising: as component A, at least one epoxide resin with an epoxy functionality greater than 1; and, as component B, a liquid or pasty hardener containing amines, polyetheramines, polyaminoamides, Mannich bases and/or compounds containing mercapto groups, which composition additionally contains a non-volatile and non-corrosive accelerator. The two-component composition is intended to be used as a structural adhesive for car body assemblies.

The present invention is therefore considered to meet a need in the art to develop a novel two-component (2K) composition which can be used advantageously and facilely in this technical field. For completeness, the Applicant has elected to focus upon two (2K) component compositions to permit the composition to be used in both assembly (or factory) settings and repair situations. Repair settings do not lend themselves to the use of one component (1K) compositions of which the curing is directly thermally induced or induced by thermally or photo-chemically activating an otherwise latent catalyst: many repair shops lack heating or irradiation equipment; and, repair shops work upon fully assembled vehicles where components adjacent to those being sealed or adhered may be heat sensitive.

STATEMENT OF THE INVENTION

In accordance with a first aspect of the present invention there is provided a two component (2K) composition comprising:
A) a first component comprising:
    a) at least one elastomer modified epoxy resin;
    b) at least one internally flexibilized epoxy resin which is characterized by a Shore D hardness, as measured with a durometer in accordance with ASTM D2240, of ≤45 when cured with diethylene triamine;
    c) at least one chelate modified epoxy resin; and
    d) optionally at least one epoxy resin different from said resins a) to c); and,
B) a second component comprising:
    e) a curative which consists of at least one compound possessing at least two epoxide reactive groups per molecule, said curative being characterized by comprising at least one Mannich base.

When the two components of this composition are brought together and react, a cured product is formed which exhibits sufficient flexibility to be operable in sealing seams, joints and the like. Moreover, the flexibility of the cured product is not achieved by compromising the mechanical strength and adhesive strength of that product: the cured product is effective as a structural adhesive.

In the composition defined above and in the appended claims, said elastomer modified epoxy resin(s) should desirably be characterized by an epoxide equivalent weight of from 200 to 500 g/eq. It also preferred that said elastomer modified epoxy resin(s) be obtainable by catalyzed addition reaction between the epoxide groups of an epoxy resin (E1) and the functional groups of an elastomer (F1), said functional groups being selected from: carboxy; amino; hydroxyl; epoxy; mercaptan; anhydride; and, isocyanate. For example, good results have been obtained where said elastomer modified epoxy resin(s) is obtainable by catalyzed addition reaction of an epoxy resin (E1) and a functionally-terminated diene-containing elastomer (F1) selected from: carboxyl-terminated polybutadiene; carboxyl-terminated poly(butadiene-acrylonitrile); and, carboxyl-terminated poly(butadiene-acrylonitrile-acrylic acid).

Said internally flexibilized epoxy resin b) should desirably be characterized by an epoxide equivalent weight of from 200 to 600 g/eq. Alternatively or additionally, said internally flexibilized epoxy resin should be characterized by a Shore D hardness, as measured with a durometer in accordance with ASTM D2240, of ≤40 when cured with diethylene triamine.

Said at least one chelate modified epoxy resin c) should desirably have an epoxide equivalent weight of from 150 to 500 g/eq. and be selected from reaction products of epoxy resins and compounds containing chelating functional groups selected from: phosphorus-containing acid groups; carboxylic acid groups; sulfur-containing acid groups; amino groups; and hydroxyl groups.

Said curative e) desirably consists of:
from 90 to 100 mol. % of said Mannich base(s);
from 0 to 10 mol. % of secondary epoxide reactive compounds selected from:
i) polyamines having at least two amine hydrogens reactive toward epoxide groups; and,
ii) mercapto compounds having at least two mercapto groups reactive toward epoxide groups.

Independently of or supplementary to this condition, it is desired that said curative e) is characterized by containing at least one phenalkamine as said Mannich base(s).

In an important embodiment of the present invention, there is provided a two component (2K) composition as defined herein above and in the appended claims, said composition comprising:
A) a first component comprising, based on the weight of said first component:
from 20 to 80 wt. %, preferably from 30 to 70 wt. % of a) at least one elastomer modified epoxy resin;
from 5 to 30 wt. %, preferably from 10 to 30 wt. % of b) at least one internally flexibilized epoxy resin;
from 1 to 15 wt. %, preferably from 1 to 10 wt. % of c) at least one chelate modified epoxy resin; and
from 0 to 25 wt. %, preferably from 0 to 20 wt. % of d) at least one epoxy resin different from said resins a) to c); and,
B) a second component comprising:
e) a curative which consists of at least one compound possessing at least two epoxide reactive groups per molecule, said curative being characterized by comprising at least one Mannich base,
wherein said two component composition is characterized in that the molar ratio of epoxide-reactive groups to epoxide groups is from 0.95:1 to 1.5:1, preferably from 0.95:1 to 1.1:1 and most preferably 1:1.

In accordance with a second aspect of the present invention, there is provided a cured product obtained from the two component (2K) composition as defined hereinabove and the appended claims. This cured reaction product has utility as an adhesive or sealant and, in particular, as a flexible sealant for shaped and jointed metallic components. For example, the use of the cured product as an effective, flexible sealant for shaped and jointed metallic components in vehicle assembly and repair has been demonstrated.

DEFINITIONS

As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps.

As used herein, the term "consisting of" excludes any element, ingredient, member or method step not specified.

As used herein, the term "consisting essentially of" limits the scope of a claim to the specified element, ingredient, member or method step and those supplementary elements, ingredients, members or methods steps which do not materially affect the basic and novel characteristic(s) of the claimed invention.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The words "preferred", "preferably", "desirably" and "particularly" are used frequently herein to refer to embodiments of the disclosure that may afford particular benefits, under certain circumstances. However, the recitation of one or more preferable, preferred, desirable or particular embodiments does not imply that other embodiments are not useful and is not intended to exclude those other embodiments from the scope of the disclosure.

As used throughout this application, the word "may" is used in a permissive sense—that is meaning to have the potential to—rather than in the mandatory sense.

As used herein, the term "(co)polymer" includes homopolymers, copolymers, block copolymers and terpolymers.

As used herein, the term "epoxide" denotes a compound characterized by the presence of at least one cyclic ether group, namely one wherein an ether oxygen atom is attached to two adjacent carbon atoms thereby forming a cyclic structure. The term is intended to encompass monoepoxide compounds, polyepoxide compounds (having two or more epoxide groups) and epoxide terminated prepolymers. The term "monoepoxide compound" is meant to denote epoxide compounds having one epoxy group. The term "polyepoxide compound" is meant to denote epoxide compounds having at least two epoxy groups. The term "diepoxide compound" is meant to denote epoxide compounds having two epoxy groups.

The epoxide may be unsubstituted but may also be inertly substituted. Exemplary inert substituents include chlorine, bromine, fluorine and phenyl.

As used herein, the term "epoxide equivalent weight" refers to the value (g/eq.) determined by ASTM D-1 652 (1997).

The term "internal flexibilization" as applied herein refers to the chemical modification of the epoxy backbone: this is conventionally effected by the incorporation of aliphatic components—preferably alkylene, oxyalkylene or polyester units or C=C bonds—into the epoxy backbone. Double carbon-carbon bonds, for instance, increase flexibility by enhancing the rotation of adjacent single carbon-carbon bonds. That aside, said flexibilized epoxy resins have a Shore D hardness—as measured with a durometer in accordance with ASTM D2240—of ≤45, preferably ≤40 when cured with diethylene triamine (DETA). And instructive references for the preparation of internally flexibilized resins meeting this hardness condition and which are useful in the present invention include, for example: U.S. Pat. No. 3,522,210 (Sellers et al.); U.S. Pat. No. 4,883,830 (Kitabatake et al.); and U.S. Pat. No. 4,793,703 (Fretz).

As used herein, "$C_1$-$C_n$ alkyl" group refers to a monovalent group that contains 1 to n carbons atoms, that is a radical of an alkane and includes straight-chain and branched organic groups. As such, a "$C_1$-$C_{30}$ alkyl" group refers to a monovalent group that contains from 1 to 30 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide and hydroxy. The halogenated derivatives of the exemplary hydrocarbon radicals listed above might, in particular, be mentioned as examples of suitable substituted alkyl groups. In general, however, a preference for unsubstituted alkyl groups containing from 1-18 carbon atoms ($C_1$-$C_{18}$ alkyl)—for example unsubstituted alkyl groups containing from 1 to 12 carbon atoms ($C_1$-$C_{12}$ alkyl)—should be noted.

The term "$C_3$-$C_{30}$ cycloalkyl" is understood to mean a saturated, mono-, bi- or tricyclic hydrocarbon group having from 3 to 30 carbon atoms. In general, a preference for cycloalkyl groups containing from 3-18 carbon atoms ($C_3$-$C_{18}$ cycloalkyl groups) should be noted. Examples of cycloalkyl groups include: cyclopropyl; cyclobutyl; cyclopentyl; cyclohexyl; cycloheptyl; cyclooctyl; adamantane; and, norbornane.

As used herein, an "$C_6$-$C_{18}$ aryl" group used alone or as part of a larger moiety—as in "aralkyl group"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; indenyl; naphthalenyl, tetrahydronaphthyl, tetrahydroindenyl; tetrahydroanthracenyl; and, anthracenyl. And a preference for phenyl groups may be noted.

As used herein, "$C_2$-$C_{12}$ alkenyl" refers to hydrocarbyl groups having from 2 to 12 carbon atoms and at least one unit of ethylenic unsaturation. The alkenyl group can be straight chained, branched or cyclic and may optionally be substituted. The term "alkenyl" also encompasses radicals having "cis" and "trans" configurations, or alternatively, "E" and "Z" configurations, as appreciated by those of ordinary skill in the art. In general, however, a preference for unsubstituted alkenyl groups containing from 2 to 10 ($C_{2-10}$) or 2 to 8 ($C_{2-8}$) carbon atoms should be noted. Examples of said $C_2$-$C_{12}$ alkenyl groups include, but are not limited to: —CH=$CH_2$; —CH=$CHCH_3$; —$CH_2$CH=$CH_2$; —C(=$CH_2$)($CH_3$); —CH=$CHCH_2CH_3$; —$CH_2$CH=$CHCH_3$; —$CH_2CH_2$CH=$CH_2$; —CH=C($CH_3$)$_2$; —$CH_2$C(=$CH_2$)($CH_3$); —C(=$CH_2$)$CH_2CH_3$; —C($CH_3$)=$CHCH_3$; —C($CH_3$)CH=$CH_2$; —CH=$CHCH_2CH_2CH_3$; —$CH_2$CH=$CHCH_2CH_3$; —$CH_2CH_2$CH=$CHCH_3$; —$CH_2CH_2CH_2$CH=$CH_2$; —C(=$CH_2$)$CH_2CH_2CH_3$; —C($CH_3$)=$CHCH_2CH_3$; —CH($CH_3$)CH=CHCH; —CH($CH_3$)$CH_2$CH=$CH_2$; —$CH_2$CH=C($CH_3$)$_2$; 1-cyclopent-1-enyl; 1-cyclopent-2-enyl; 1-cyclopent-3-enyl; 1-cyclohex-1-enyl; 1-cyclohex-2-enyl; and, 1-cyclohexyl-3-enyl.

As used herein, "alkylaryl" refers to alkyl-substituted aryl groups and "substituted alkylaryl" refers to alkylaryl groups further bearing one or more substituents as set forth above.

The term "hetero" as used herein refers to groups or moieties containing one or more heteroatoms, such as N, O, Si and S. Thus, for example "heterocyclic" refers to cyclic groups having, for example, N, O, Si or S as part of the ring structure. "Heteroalkyl" and "heterocycloalkyl" moieties are alkyl and cycloalkyl groups as defined hereinabove, respectively, containing N, O, Si or S as part of their structure.

As used herein, the term "catalytic amount" means a sub-stoichiometric amount of catalyst relative to a reactant, except where expressly stated otherwise.

The term "photoinitiator" as used herein denotes a compound which can be activated by an energy-carrying activation beam—such as electromagnetic radiation—for instance upon irradiation therewith. The term is intended to encompass both photoacid generators and photobase generators. Specifically, the term "photoacid generator" refers to a compound or polymer which generates an acid for the catalysis of the acid hardening resin system upon exposure to actinic radiation. The term "photobase generator" means any material which when exposed to suitable radiation generates one or more bases.

The term "Lewis acid" used herein denotes any molecule or ion—often referred to as an electrophile—capable of combining with another molecule or ion by forming a covalent bond with two electrons from the second molecule or ion: a Lewis acid is thus an electron acceptor.

As employed herein a "primary amino group" refers to an $NH_2$ group that is attached to an organic radical, and a "secondary amino group" refers to an NH group that is attached to two organic radicals, which may also together be part of a ring. Where used, the term "amine hydrogen" refers to the hydrogen atoms of primary and secondary amino groups.

The "amine equivalent weight" is a calculated value (g/eq.) determined from the amine number. That amine number is determined by titration of the amine acetate ion by a dilute, typically 1 N HCl solution. For a pure material, the amine number can be calculated using the molecular weights of the pure compound and KOH (56.1 g/mol). Instructive guidance may be found, for illustration, in https://dowac-.custhelp.com/app/answers/detail/a_id/12987.

The term "Mannich Base" is used herein in accordance with its standard definition in the art as a ketonic amine obtainable from the condensation of ammonia, diamines or polyamines with active hydrogen components selected from aldehydes, ketones, esters or aromatics (e.g. phenols) and/or heteroaromatics. Phenalkamines—herein acting as curing agents—are Mannich base compounds that are the reaction product of an aldehyde, an amine and a phenolic compound.

"Two-component (2K) compositions" in the context of the present invention are understood to be compositions in which a binder component (A) and a hardener component (B) must be stored in separate vessels because of their (high) reactivity. The two components are mixed only shortly before application and then react, typically without additional activation, with bond formation and thereby formation of a polymeric network. However, catalysts may also be employed or higher temperatures applied in order to accelerate the cross-linking reaction.

The Shore A hardness of a given material mentioned herein is determined using a durometer in accordance with ISO 868 entitled "*Plastics and Ebonite—Determination of Indentation Hardness by Means of a Durometer (Shore Hardness)*", the contents of which standard are incorporated herein by reference in their entirety. Throughout the present description, all standard Shore A hardness measurements were performed on injection molded plates at 10 seconds using Type A durometer.

The term "flexible" as used herein refers to the ability to bend or flex and/or the ability to withstand stress and strain without exhibiting macroscopic failure, such as may be evidenced fracture or cracking being damaged or broken with when subjected to certain force applied. A macroscopic failure is one which is visually detectable by the unaided eye. The flexible adhesives and sealants of the present invention are capable of bending at least 5° and/or are characterized by a bend radius of at less than 1 m, preferably less than 0.5 m as determined under ASTM E290—14 Standard Test Methods for Bend Testing of Material for Ductility.

Viscosities of the coating compositions described herein are, unless otherwise stipulated, measured using the Brookfield Viscometer, Model RVT at standard conditions of 20°

C. and 50% Relative Humidity (RH). The viscometer is calibrated using silicone oils of known viscosities, which vary from 5,000 cps to 50,000 cps. A set of RV spindles that attach to the viscometer are used for the calibration. Measurements of the coating compositions are done using the No. 6 spindle at a speed of 20 revolutions per minute for 1 minute until the viscometer equilibrates. The viscosity corresponding to the equilibrium reading is then calculated using the calibration.

The term "polyol" as used herein shall include diols and higher functionality hydroxyl compounds.

The hydroxyl (OH) values given herein are measured according to Japan Industrial Standard (JIS) K-1557, 6.4. The isocyanate content values given herein are measured according to EN ISO 1 1909.

The molecular weights referred to in this specification can be measured with gel permeation chromatography (GPC) using polystyrene calibration standards, such as is done according to ASTM 3536.

As used herein, "ambient conditions" means the temperature and pressure of the surroundings in which the coating layer or the substrate of said coating layer is located.

As used herein, "anhydrous" means the relevant composition includes less than 0.25% by weight of water. For example the composition may contain less than 0.1% by weight of water or be completely free of water. The term "essentially free of solvent" should be interpreted analogously as meaning the relevant composition comprises less than 0.25% by weight of solvent.

DETAILED DESCRIPTION OF THE INVENTION a) Elastomer Modified Epoxy Resin

The two component (2K) composition of the present invention necessarily comprises an elastomer modified epoxy resin, which resin should desirably have an epoxide equivalent weight of from 200 to 2500 g/eq., for example from 200 to 500 g/eq.

Without intention to limit the present invention, it is preferred that the composition contains from 10 to 60 wt. %, preferably from 10 to 50 wt. % of said elastomer modified epoxy resin, based on the weight of the composition. In an alternative expression of the constitution of the present composition, which is not intended to be mutually exclusive of that mentioned above, it is preferred that said elastomer modified epoxy resin constitutes from 20 to 80 wt. %, preferably from 30 to 70 wt. % of the first component of the composition.

Elastomer modification of an epoxy resin (hereinafter denoted E1) may be conducted by any suitable method known to the skilled artisan but it should generally be performed through a catalyzed addition reaction between the functional groups of the elastomer (hereinafter denoted F1) and the oxirane groups of the epoxy resin (E1). Such an addition reaction may be conducted in a suitable solvent and under at least one of following conditions: i) a temperature of from 40° C. to 200° C.; ii) a reaction duration of from 0.5 to 5 hours; and iii) catalysis. Exemplary catalysts include: tertiary amine catalysts, such as tributylamine; quaternary ammonium salts, such as tetrabutylammonium chloride; tertiary phosphates, such as triphenylphosphate; quaternary phosphonium salts, such as ethyltriphenyl phosphonium iodide (ETPPI); metal salts, such as AMC-2 (a chromium octoate salt); and, combinations of these catalysts where staged addition reactions are effected.

The epoxy resin (E1) to be modified has a 1,2-epoxy equivalency of greater than one and preferably of at least 2. The epoxy resin (E1) may be linear or branched, saturated or unsaturated, aliphatic, cycloaliphatic, aromatic or heterocyclic. And as examples of epoxy resins (E1), there may be mentioned: polyglycidyl ethers of polyhydric compounds; brominated epoxies; epoxy novolacs or similar polyhydroxyphenol resins; polyglycidyl ethers of glycols or polyglycols; and, polyglycidyl esters of polycarboxylic acids. A preference may be acknowledged for the use of a polyglycidyl ether of a polyhydric phenol as said epoxy resin (E1).

The functionalized elastomer (F1) is broadly any elastomer which is functionalized—either terminally or non-terminally—with a group which is reactive to the oxirane group of the epoxy resin (E1). Suitable functional groups include but are not limited to: carboxy; amino; hydroxyl; epoxy; mercaptan; anhydride; and, isocyanate. In addition, the elastomer (F1) may be a functionalized homo-polymer or a functionalized random, block or star co-polymer.

In an important embodiment, the functional elastomer (F1) used to modify the epoxy resin (E1) is a functionally-terminated diene-containing polymer having the general formula:

Wherein: B is a polymer backbone polymerized from monomers selected from: $C_4$-$C_{10}$ dienes; $C_4$-$C_{10}$ dienes and at least one vinyl aromatic monomer, such as styrene, $C_1$-$C_6$ alkyl-substituted styrene, or halogen-substituted styrene; $C_4$-$C_{10}$ dienes and at least one vinyl nitrile monomer, such as acrylonitrile or methacrylonitrile; $C_4$-$C_{10}$ dienes, at least one vinyl nitrile monomer and at least one vinyl aromatic monomer; or, $C_4$-$C_{10}$ dienes, at least one vinyl nitrile monomer and an acrylate of the formula $CH_2$=CR—COOR$^1$ wherein R and R$^1$ are independently of one another selected from hydrogen or $C_1$-$C_{10}$ alkyl groups; and, X can be any functional group that can react with an oxirane group, of which suitable examples include carboxy, amino, hydroxyl, epoxy, mercaptan, anhydride and isocyanate groups.

As the reactant elastomer (F1), the functionally-terminated diene-containing polymer should typically be characterized by a functionality of from 1.1 to 2.5, for example from 1.5 to 2.5 or from 1.6 to 2.4. That aside, it is not precluded that the backbone (X) of the polymer be partially hydrogenated.

By way of non-limiting example, the functionally-terminated diene-containing polymer (F1) may be selected from: carboxyl-terminated polybutadiene; carboxyl-terminated poly(butadiene-acrylonitrile); and, carboxyl-terminated poly(butadiene-acrylonitrile-acrylic acid).

A preference as elastomer (F1) for carboxyl-terminated poly(butadiene-acrylonitrile) (CTBN) may be noted and in particular for carboxyl-terminated poly(butadiene-acrylonitrile) (CTBN) constituted by: from 5 to 30 wt. % acrylonitrile; and, from 70 to 95 wt. % butadiene. Independently or additionally to this constitution, the carboxyl-terminated poly(butadiene-acrylonitrile) (CTBN) should have a number average molecular weight (Mn) of from 1000 to 50000 g/mol, for example from 2000 to 10000 g/mol. Further, the carboxyl-terminated poly(butadiene-acrylonitrile) is not precluded from including other functional groups—such as amino, phenolic, hydroxyl, epoxy, mercaptan or anhydride groups—pendent on the chain, in addition to the terminal carboxyl groups.

Aside from functionally-terminated diene-containing polymers, the use of diene-containing polymers functionalized non-terminally along the chain skeleton may be useful in some embodiments. Such functionalized polymers (F1) might include, by way of example: carboxylated polybutadiene; carboxylated poly(butadiene-styrene); mid-block carboxylated poly(styrene-ethylene/butadiene-styrene); amidated poly(butadiene-styrene); mercapto-polybutadiene; epoxidized polybutadiene; and epoxidized poly(butadiene-styrene).

In a further embodiment of the present invention, the two component (2K) composition is characterized in that said at least one elastomer functionalized epoxy resin either comprises or consists of at least one urethane modified epoxy resin. In this embodiment, the functionalized elastomer (F1) which modified the epoxy resin (E1) is an isocyanate group-terminated, urethane pre-polymer obtainable by reacting a polyisocyanate compound (1) and a polyhydroxyl (P) compound. Without intention to limit this embodiment, the urethane pre-polymer (F1) should be characterized by: i) an NCO content of from 5 to 30%, preferably from 10 to 25% by weight, based on the prepolymer; and, ii) a functionality of 1.1 to 2.5. These characterizing properties may be found in known commercially available pre-polymers. Alternatively, components (I) and (P) may be reacted in a ratio and under conditions such that these properties of the resultant pre-polymer are achieved.

The polyisocyanates (I) used in preparing the pre-polymer (F1) include any aliphatic, cycloaliphatic, arylaliphatic, heterocyclic or aromatic polyisocyanate, or mixture thereof, having an average isocyanate functionality of at least 2.0 and an equivalent weight of at least 80. The isocyanate functionality of the polyisocyanate (I) will more generally be from 2.2 to 4.0, for example 2.3 to 3.5. Whilst functionalities greater than 4.0 may be used, their use can cause excessive crosslinking. The equivalent weight of the polyisocyanate is typically from 100 to 300, preferably from 1 10 to 250, and more preferably from 120 to 200.

The polyisocyanates, where required, may have been biuretized and/or isocyanurated by generally known methods, such as described in UK Patent No. 889,050.

Examples of suitable polyisocyanates (I) include but are not limited to: ethylene diisocyanate; 1,4-tetramethylene diisocyanate; hexamethylene diisocyanate (HDI); biuret or trimers of HDI; 1,12-dodecane diisocyanate, cyclobutane-1,3-diisocyanate cyclohexane-1,3- and 1,4-diisocyanate and mixtures of these isomers; 1-isocyanato-3,3,5-trimethyl-5-isocyanato methyl cyclohexane; 2,4- and 2,6-hexahydrotolylene diisocyanate and mixtures of these isomers; hexahydrol, 3- and/or 1,4-phenylene diisocyanate; perhydro-2,5'- and/or 4,4'-diphenyl methane diisocyanate; 1,3- and 1,4-phenylene diisocyanate; 2,4- and 2,6-tolylene diisocyanate and mixtures of these isomers; diphenyl methane-2,4'- and/or 4,4'-diisocyanate (MDI); naphthylene-1,5-diisocyanate; triphenyl methane-4,4',4'-tri-isocyanate; and, polyphenyl polymethylene polyisocyanates of the type obtained by condensing aniline with formaldehyde, followed by phosgenation such as described in UK Patent Nos. 874,430 and 848,671. It is noted that di- and/or polyisocyanates comprising ester, urea, allophanate, carbodiimide, uretdione and/ or urethane groups may also be used in the process according to the invention.

The polyhydroxyl compound (P) used to derive the urethane pre-polymer (F1) should conventionally have a number average molecular weight (Mn) of from 400 to 10000 g/mol. The hydroxyl number of the polyhydroxy compound (P) should conventionally be from 20 to 850 mg KOH/g and preferably from 25 to 500 mg KOH/g. Further, it is desirable that the polyhydroxy compound (P) be selected from divalent or polyvalent: polyether polyols; polyester polyols; poly(ether-ester) polyols; poly(alkylene carbonate) polyols; hydroxyl-containing polythioethers; polymer polyols; and mixtures thereof.

Whilst diols and triols of low molecular weights, for instance from 60 to 400 or 300 g/mol., may be reactive towards isocyanates (I), these polyols are typically only used as starter molecules, chain extenders and/or crosslinking agents in a reaction mixture which contains the one or more active hydrogen compounds (P). In this regard, mention may be made: aliphatic, cycloaliphatic and/or aralphatic diols having from 2 to 14 and preferably from 4 to 10 carbon atoms, such as ethylene glycol, 1,3-propanediol, 1,4-butanediol, 1,6-hexanediol, 1,10-decanediol, o-, m- and p-dihydroxycyclohexane; diethylene glycol; dipropylene glycol; bis(2-hydroxyethyl)hydroquinone; and, triols, such as 1,2, 4-, and 1,3,5-trihydroxycyclohexane, glycerol and trimethylolpropane.

Polyether polyols are well-known in the art and include polyoxyethylene, polyoxypropylene, polyoxybutylene and polytetramethylene ether diols and triols. The polyether polyols may generally have molecular weights of from 400 to 10 000 g/mol, for example from 1000 to 7000 g/mol, and be prepared by polymerizing alkylene oxides in the presence of an active hydrogen-containing initiator compound, as described in U.S. Pat. Nos. 42,699,945, 4,218,543 and 4,374,210 for instance. The alkylene oxide monomers are typically selected from the group consisting of: ethylene oxide; propylene oxide; butylene oxides; styrene oxide; epichlorohydrin; epibromohydrin; and, mixtures thereof. The active hydrogen initiators are in turn typically selected from the group consisting of: water; ethylene glycol; propylene glycol; butanediol; hexanediol; glycerin; trimethylol propane; pentaerythritol; hexanetriol; sorbitol; sucrose; hydroquinone; resorcinol; catechol; bisphenols; novolac resins; phosphoric acid; amines; and mixtures thereof.

As is known in the art, polyester polyols may be prepared by reacting a polycarboxylic acid or anhydride thereof with a polyhydric alcohol. Examples of suitable polycarboxylic acids include succinic acid, adipic acid, suberic acid, azelaic acid, sebacic acid, phthalic acid, isophthalic acid, maleic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, maleic acid anhydride, glutaric acid anhydride, fumaric acid, and mixtures thereof. Examples of polyhydric alcohols which are useful in preparing polyester polyols include ethylene glycols, propane diols, butane diols, 1,6-hexanediol, 1,8-octanediol, neopentylglycol, glycerol, trimethylol propane, pentaerythritol, quinitol, mannitol, sorbitol, methyl glycoside, diethylene glycol, triethylene glycol, tetraethylene glycol, polyethylene glycols, polypropylene glycols, and mixtures thereof. As regards the present invention, useful polyester polyols will typically have molecular weights of from 1000 to 10000 g/mol.

In an embodiment of the present invention, the reactant polyhydroxyl compound(s) (P) have an average functionality of at least 1.5, preferably at least 1.8 and more preferably at least 2.0, but no greater than 4.0, preferably no greater than about 3.5 and more preferably no greater than 3.0. Independently or additionally, the equivalent weight of the reactant polyhydroxyl compound(s) (P) is at least 200, preferably at least 500 and more preferably at least about 1,000 but no greater than 3500, preferably no greater than 3000 and more preferably no greater than 2500.

Starting from components (P) and (I) as defined above, the polyurethane pre-polymer (F1) may be prepared under anhydrous conditions by any suitable method, such as bulk polymerization and solution polymerization. The polyhydroxyl compound(s) (P) are present therein an amount sufficient to react with most of the isocyanate groups but leaving enough isocyanate groups to correspond with the desired free isocyanate content of the urethane pre-polymer (F1). And in that embodiment where the polyhydroxyl compound(s) (P) comprise a mixture of diols and triols, the proportion of diol to triol must be chosen to achieve the desired isocyanate functionality of the urethane prepolymer (F1).

Having regard to both preferred embodiments discussed herein above, commercial examples of suitable elastomer modified epoxy resins include: Hypox® resins available from CVC Thermosets; EPON 58005 and EPON 58034 available from Miller-Stephenson; and, EPU-6, EPU-7N, EPU-11F, EPU-15F, EPU-1395, EPU-738, EPU-17, EPU-17T-6 and EPU-80 available from Adeka Corporation.

b) Internally Flexibilized Epoxy Resin

The present composition includes at least one internally flexibilized epoxy resin, which resin should desirably have an epoxide equivalent weight of from 200 to 2500 g/eq., for example from 200 to 600 g/eq.

Without intention to limit the present invention, it is preferred that the composition contains from 1 to 25 wt. %, preferably from 5 to 25 wt. % of said internally flexibilized epoxy resin, based on the weight of the composition. In an alternative expression of the constitution of the present composition, which is not intended to be mutually exclusive of that mentioned above, it is preferred that said internally flexibilized epoxy resin constitutes from 5 to 30 wt. %, preferably from 10 to 30 wt. % of the first component of the composition.

In a first preferred embodiment, the composition includes an internally flexibilized epoxy resin having the general formula (I):

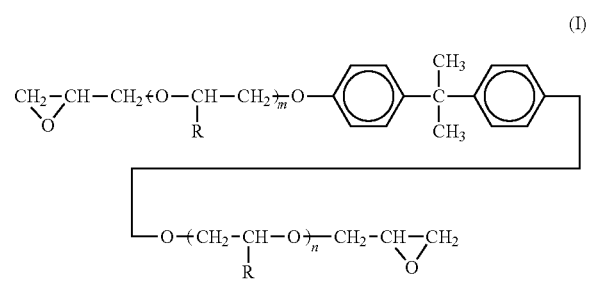

(I)

wherein: R represents a $C_1$-$C_6$ alkyl group or —$CH_2OR'$ wherein R' a $C_1$-$C_{18}$ hydrocarbyl group; and, m and n are independently integers ≥0 but wherein (m+n) is an integer of from 1 to 6, for example from 1 to 3. Said $C_1$-$C_{18}$ hydrocarbyl group (R') may be an aliphatic, alicyclic, aromatic or aromatic-aliphatic group of which examples include: $C_1$-$C_{10}$, in particular $C_1$-$C_6$ alkyl groups; $C_2$-$C_4$ alkenyl groups; $C_5$-$C_7$ cycloalkyl groups; $C_6$-$C_{18}$ aryl groups; and $C_7$-$C_{10}$ aralkyl groups. It is noted that when R is —$CH_2OR'$, the condition m=n=1 is preferred.

The diepoxide compound represented by formula (I) used in this invention is obtainable by:

i) adding to bisphenol A, a compound represented by the following formula (II)

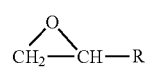

(II)

wherein R is as defined hereinabove; and, ii) epoxidizing the adduct with an epihalohydrin such as epichlorohydrin.

The preferred embodiments of the compound of formula (II) include: 1,2-alkylene oxides, such a 1,2-propylene oxide and 1,2-butylene oxide; alkylglycidylethers, such as isopropylglycidylether, butylglycidylether and 2-ethylhexylglycidylether; alkenylglycidylethers, such as vinylglycidylether and allylglycidylether; cycloalkylglycidylethers, such as cyclopentylglycidylether and cyclohexylglycidylether; and arylglycidyl ethers such as phenylglycidylether and p-sec-butylglycidylether.

In a second embodiment, the composition includes an internally flexibilized epoxy resin having the general formula (III):

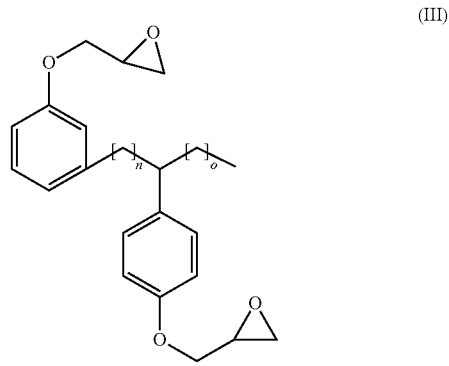

(III)

wherein n and o are the same or different and are independently selected from 1 to 10. In an embodiment, n and o are independently selected from 2 to 8, for example from 4 to 8.

Representative of commercially available resins suitable for use in the present invention are: DER 732, available from Dow Chemical; Epo-Tek 310A, available from Epoxy Technology; XB-4122, PY-322 and PY-4122US, available from Ciba-Geigy; WC-68, available from Wilmington Chemical; Anthiol R-12, available from Pacific Anchor; and NC-514 and NC-514S available from Cardiolite.

c) Chelate Modified Epoxy Resin

To help improve adhesion of the cured adhesive or sealant to a substrate surface—especially a metallic substrate surface which has been contaminated with the oily substances commonly encountered in vehicle assembly operations—the present composition comprises at least one chelate-modified epoxy resin. Said resins, which should desirably have an epoxide equivalent weight of from 150 to 500 g/eq., for example from 150 to 300 g/eq., are the reaction products of epoxy resins and compounds containing chelating functional groups.

The chelating functional groups include those functional groups capable of forming chelate bonds with divalent or polyvalent metal atoms either by themselves or in cooperation with other functional groups positioned on the same molecule. Without intention to limit the present invention, suitable chelating functional groups include: phosphorus-containing acid groups, such as —PO(OH)$_2$; carboxylic acid groups (—CO$_2$H); sulfur-containing acid groups, such as —SO$_3$H; amino groups; and, hydroxyl groups, in particular hydroxyl groups positioned adjacent to each other on aromatic rings.

The preparation of such reaction products may be carried out by methods known in the art. Instructive references in this regard include: U.S. Pat. Nos. 4,702,962; 4,340,716; European Patent No. EP 342 035; Japanese Patent Publications No. P 58-063758; and Japanese Patent Publication No. JP 58-069265.

Reaction products of epoxy resins and compounds containing chelating functional groups are also available from commercial sources such as, for example, the ADEKA Resins EP-49-10N, EP-49-55C, EP-49-10, EP-49-20, EP-49-23, and EP-49-25 available from Asahi Denka.

The composition of the present invention should contain from 1 to 10 wt. %, preferably from 1 to 8 wt. % of said chelate-modified epoxy resins, based on the weight of the composition.

In an alternative expression of the constitution of the present composition, which is not intended to be mutually exclusive of that mentioned above, it is preferred that said chelate-modified epoxy resins constitute from 1 to 15 wt. %, preferably from 1 to 10 wt. % of the first component of the composition.

d) Epoxide Compounds

The two (2K) component of the present invention may optionally comprise—in an amount up to 50 wt. %, based on the weight of the composition—supplementary epoxy resins to those defined above (a), b) and c)).

For example, the composition of the present invention may contain from 0 to 20 wt. %, for example from 0 to 10 wt. % of said epoxy resins d), based on the weight of the composition. In an alternative expression of the preferred constitution of the present composition, which is not intended to be mutually exclusive of that mentioned above, said epoxy resins d) may constitute from 0 to 25 wt. %, preferably from 0 to 20 wt. % of the first component of the composition.

Epoxy resins as used herein may include mono-functional epoxy resins, multi- or poly-functional epoxy resins, and combinations thereof. The epoxy resins may be pure compounds but equally may be mixtures epoxy functional compounds, including mixtures of compounds having different numbers of epoxy groups per molecule. An epoxy resin may be saturated or unsaturated, aliphatic, cycloaliphatic, aromatic or heterocyclic and may be substituted. Further, the epoxy resin may also be monomeric or polymeric.

Without intention to limit the present invention, illustrative monoepoxide compounds include: alkylene oxides; epoxy-substituted cycloaliphatic hydrocarbons, such as cyclohexene oxide, vinylcyclohexene monoxide, (+)-cis-limonene oxide, (+)-cis,trans-limonene oxide, (−)-cis,trans-limonene oxide, cyclooctene oxide, cyclododecene oxide and α-pinene oxide; epoxy-substituted aromatic hydrocarbons; monoepoxy substituted alkyl ethers of monohydric alcohols or phenols, such as the glycidyl ethers of aliphatic, cycloaliphatic and aromatic alcohols; monoepoxy-substituted alkyl esters of monocarboxylic acids, such as glycidyl esters of aliphatic, cycloaliphatic and aromatic monocarboxylic acids; monoepoxy-substituted alkyl esters of polycarboxylic acids wherein the other carboxy group(s) are esterified with alkanols; alkyl and alkenyl esters of epoxy-substituted monocarboxylic acids; epoxyalkyl ethers of polyhydric alcohols wherein the other OH group(s) are esterified or etherified with carboxylic acids or alcohols; and, monoesters of polyhydric alcohols and epoxy monocarboxylic acids, wherein the other OH group(s) are esterified or etherified with carboxylic acids or alcohols.

By way of example, the following glycidyl ethers might be mentioned as being particularly suitable monoepoxide compounds for use herein: methyl glycidyl ether; ethyl glycidyl ether; propyl glycidyl ether; butyl glycidyl ether; pentyl glycidyl ether; hexyl glycidyl ether; cyclohexyl glycidyl ether; octyl glycidyl ether; 2-ethylhexyl glycidyl ether; allyl glycidyl ether; benzyl glycidyl ether; phenyl glycidyl ether; 4-tert-butylphenyl glycidyl ether; 1-naphthyl glycidyl ether; 2-naphthyl glycidyl ether; 2-chlorophenyl glycidyl ether; 4-chlorophenyl glycidyl ether; 4-bromophenyl glycidyl ether; 2,4,6-trichlorophenyl glycidyl ether; 2,4,6-tribromophenyl glycidyl ether; pentafluorophenyl glycidyl ether; o-cresyl glycidyl ether; m-cresyl glycidyl ether; and, p-cresyl glycidyl ether.

In an important embodiment, the monoepoxide compound conforms to Formula (III) herein below:

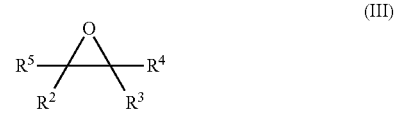

(III)

wherein: $R^2$, $R^3$, $R^4$ and $R^5$ may be the same or different and are independently selected from hydrogen, a halogen atom, a $C_1$-$C_8$ alkyl group, a $C_3$ to $C_{10}$ cycloalkyl group, a $C_2$-$C_{12}$ alkenyl, a $C_6$-$C_{18}$ aryl group or a $C_7$-$C_{18}$ aralkyl group, with the proviso that at least one of $R^3$ and $R^4$ is not hydrogen.

It is preferred that $R^2$, $R^3$ and $R^5$ are hydrogen and $R^4$ is either a phenyl group or a $C_1$-$C_8$ alkyl group and, more preferably, a $C_1$-$C_4$ alkyl group.

Having regard to this embodiment, exemplary monoepoxides include: ethylene oxide; 1,2-propylene oxide (propylene oxide); 1,2-butylene oxide; cis-2,3-epoxybutane; trans-2,3-epoxybutane; 1,2-epoxypentane; 1,2-epoxyhexane; 1,2-heptylene oxide; decene oxide; butadiene oxide; isoprene oxide; and, styrene oxide.

In the present invention, reference is made to using at least one monoepoxide compound selected from the group consisting of: ethylene oxide; propylene oxide; cyclohexene oxide; (+)-cis-limonene oxide; (+)-cis,trans-limonene oxide; (−)-cis,trans-limonene oxide; cyclooctene oxide; and cyclododecene oxide.

Again, without intention to limit the present invention, suitable polyepoxide compounds may be liquid, solid or in solution in solvent. Further, such polyepoxide compounds should have an epoxide equivalent weight of from 100 to 700 g/eq, for example from 120 to 320 g/eq. And generally, diepoxide compounds having epoxide equivalent weights of less than 500 g/eq. or even less than 400 g/eq. are preferred: this is predominantly from a cost standpoint, as in their production, lower molecular weight epoxy resins require more limited processing in purification.

As examples of types or groups of polyepoxide compounds which may be polymerized in present invention, mention may be made of: glycidyl ethers of polyhydric alcohols and polyhydric phenols; glycidyl esters of polycarboxylic acids; and, epoxidized polyethylenically unsaturated hydrocarbons, esters, ethers and amides.

Suitable diglycidyl ether compounds may be aromatic, aliphatic or cycloaliphatic in nature and, as such, can be derivable from dihydric phenols and dihydric alcohols. And useful classes of such diglycidyl ethers are: diglycidyl ethers of aliphatic and cycloaliphatic diols, such as 1,2-ethanediol, 1,4-butanediol, 1,6-hexanediol, 1,8-octanediol, 1,12-dodecanediol, cyclopentane diol and cyclohexane diol; bisphenol A based diglycidylethers; bisphenol F diglycidyl ethers; diglycidyl o-phthalate, diglycidyl isophthalate and diglycidyl terephthalate; polyalkyleneglycol based diglycidyl ethers, in particular polypropyleneglycol diglycidyl ethers; and, polycarbonatediol based glycidyl ethers. Other suitable diepoxides which might also be mentioned include: diepoxides of double unsaturated fatty acid C1-C18 alkyl esters; butadiene diepoxide; polybutadiene diglycidyl ether; vinylcyclohexene diepoxide; and, limonene diepoxide.

Further illustrative polyepoxide compounds include but are not limited to: glycerol polyglycidyl ether; trimethylolpropane polyglycidyl ether; pentaerythritol polyglycidyl ether; diglycerol polyglycidyl ether; polyglycerol polyglycidyl ether; and, sorbitol polyglycidyl ether.

And examples of highly preferred polyepoxide compounds include: bisphenol-A epoxy resins, such as DER™ 331, and DER™ 383; bisphenol-F epoxy resins, such as DER™ 354; bisphenol-A/F epoxy resin blends, such as DER™ 353; aliphatic glycidyl ethers, such as DER™ 736; polypropylene glycol diglycidyl ethers, such as DER™ 732; solid bisphenol-A epoxy resins, such as DER™ 661 and DER™ 664 UE; solutions of bisphenol-A solid epoxy resins, such as DER™ 671-X75; epoxy novolac resins, such as DEN™ 438; brominated epoxy resins such as DER™ 542; castor oil triglycidyl ether, such as ERISYS™ GE-35H; polyglycerol-3-polyglycidyl ether, such as ERISYS™ GE-38; and, sorbitol glycidyl ether, such as ERISYS™ GE-60.

Whilst it is does not represent a preferred embodiment, the present invention does not preclude the curable compositions further comprising one or more cyclic monomers selected from the group consisting of: oxetanes; cyclic carbonates; cyclic anhydrides; and lactones. The disclosures of the following citations may be instructive in disclosing suitable cyclic carbonate functional compounds: U.S. Pat. Nos. 3,535,342; 4,835,289; 4,892,954; UK Patent No. GB-A-1,485,925; and EP-A-0 119 840. However, such cyclic co-monomers should constitute less than 20 wt. %, preferably less than 10 wt. % or less than 5 wt. %, based on the total weight of the epoxide compounds.

e) Curative

The curative e) necessarily consists of at least one compound possessing at least two epoxide reactive groups per molecule. In the present invention, the curative e) is characterized by comprising at least one Mannich base. Moreover, in a preferred embodiment, the curative e) is characterized by containing at least one phenalkamine and in particular a phenalkamine obtained from the condensation of cardanol (CAS Number: 37330-39-5), an aldehyde and an amine. The reactant amine in the condensation reaction is desirably ethylenediamine or diethyltriamine.

Mannich bases and phenalkamines are known in the art and suitable examples include the commercially available phenalkamines Cardolite® NC-541, NC-557, NC-558, NC-566, Lite 2001 and Lite 2002 (available from Cardolite), Aradur® 3440, 3441, 3442 and 3460 (available from Huntsman) and Beckopox® EH 614, EH 621, EH 624, EH 628 and EH 629 (available from Cytec).

Whilst it is preferred that the curative e) consists of or consists essentially of said Mannich base(s), the presence of other curing agents in an amount up to 10 mol. %, based on the total moles of said Mannich base(s) is not precluded by the present invention. Supplementary curatives may, in particular include either one or both of: i) at least one polyamine having at least two amine hydrogens reactive toward epoxide groups; and at least one mercapto compound having at least two mercapto groups reactive toward epoxide groups.

The at least one polyamine having at least two amine hydrogens reactive toward epoxide groups should, in particular, contain primary and/or secondary amine groups and have an equivalent weight per primary or secondary amine group of not more than 150 g/eq., more preferably not more than 125 g/eq.

Suitable polyamines, which may be used alone or in combination, include but are not limited to the following:

i) Aliphatic, cycloaliphatic or arylaliphatic primary diamines of which the following examples may be mentioned: 2,2-dimethyl-1,3-propanediamine; 1,3-pentanediamine (DAMP); 1,5-pentanediamine; 1,5-diamino-2-methylpentane (MPMD); 2-butyl-2-ethyl-1,5-pentanediamine (C11-neodiamine); 1,6-hexanediamine (hexamethylenediamine, HMDA); 2,5-dimethyl-1,6-hexanediamine; 2,2,4- and/or 2,4,4-trimethylhexamethylenediamine; 1,7-heptanediamine; 1,8-octanediamine; 1,9-nonanediamine; 1,10-decanediamine; 1,11-undecanediamine; 1,12-dodecanediamine; 1,2-, 1,3- and 1,4-diaminocyclohexane; bis(4-aminocyclohexyl)methane; bis(4-amino-3-methylcyclohexyl)methane; bis(4-amino-3-ethylcyclohexyl)methane; bis(4-amino-3,5-dimethylcyclohexyl)methane; bis(4-amino-3-ethyl-5-methylcyclohexyl)methane; 1-amino-3-aminomethyl-3,5,5-trimethylcyclohexane (isophorone diamine, IPDA); 2- and/or 4-methyl-1,3-diaminocyclohexane; 1,3-bis(aminomethyl)-cyclohexane; 1,4-bis(aminomethyl) cyclohexane; 2,5(2,6)-bis(aminomethyl)-bicyclo[2.2.1] heptane (norborane diamine, NBDA); 3(4),8(9)-bis(aminomethyl)tricyclo[5.2.1.0$^{2,6}$]-decane (TCD-diamine); 1,4-diamino-2,2,6-trimethylcyclohexane (TMCDA); 1,8-menthanediamine; 3,9-bis(3-aminopropyl)-2,4,8,10-tetraoxaspiro[5.5]undecane; and, 1,3-bis(aminomethyl)benzene (MXDA).

ii) Tertiary amine group-containing polyamines with two or three primary aliphatic amine groups of which the following specific examples may be mentioned: N,N'-bis(aminopropyl)-piperazine; N,N-bis(3-aminopropyl)methylamine; N,N-bis(3-aminopropyl)ethylamine; N,N-bis(3-aminopropyl)propylamine; N,N-bis(3-aminopropyl) cyclohexylamine; N,N-bis(3-aminopropyl)-2-ethylhexylamine; tris(2-aminoethyl)amine; tris(2-aminopropyl) amine; tris(3-aminopropyl)amine; and, the products from the double cyanoethylation and subsequent reduction of fatty amines derived from natural fatty acids, such as N,N-bis(3-aminopropyl)dodecylamine and N,N-bis(3-aminopropyl)tallow alkylamine, commercially available as Triameen® Y12D and Triameen® YT (from Akzo Nobel).

iii) Ether group-containing aliphatic primary polyamines of which the following specific examples may be mentioned: bis(2-aminoethyl)ether; 3,6-dioxaoctane-1,8-diamine; 4,7-dioxadecane-1,10-diamine; 4,7-dioxadecane-2,9-diamine; 4,9-dioxadodecane-1,12-diamine; 5,8-dioxadodecane-3,10-diamine; 4,7,10-trioxatridecane-1,13-diamine and higher oligomers of these diamines; bis(3-aminopropyl)polytetrahydrofuranes and other polytetrahydrofuran diamines; cycloaliphatic ether group-containing diamines obtained from the propoxylation and subsequent amination of 1,4-dimethylolcyclohexane, such as that material commercially available as Jeffamine® RFD-270 (from Huntsman); polyoxyalkylenedi- or -triamines obtainable as products from the amination of polyoxyalkylenedi- and -triols and which are commercially available under the name of Jeffamine® (from Huntsman), under the name of polyetheramine (from BASF) or under the name of PC Amines® (from Nitroil). A particular preference may be noted for the use of Jeffamine® D-230, Jeffamine® D-400, Jeffamine® D-600, Jeffamine® D-2000, Jeffamine® D-4000, Jeffamine® T-403, Jeffamine® T-3000, Jeffamine® T-5000, Jeffamine® EDR-104, Jeffamine® EDR-148 and Jeffamine® EDR-176, as well as corresponding amines from BASF or Nitroil.

iv) Primary diamines with secondary amine groups of which the following examples may be mentioned: 3-(2-aminoethyl)aminopropylamine, bis(hexamethylene)triamine (BHMT); diethylenetriamine (DETA); triethylenetetramine (TETA); tetraethylenepentamine (TEPA); pentaethylenehexamine (PEHA); higher homologs of linear polyethyleneamines, such as polyethylene polyamines with 5 to 7 ethyleneamine units (so-called "higher ethylenepolyamine," HEPA); products from the multiple cyanoethylation or cyanobutylation and subsequent hydrogenation of primary di- and polyamines with at least two primary amine groups, such as dipropylenetriamine (DPTA), N-(2-aminoethyl)-1,3-propanediamine (N3-amine), N,N'-bis(3-aminopropyl)ethylenediamine (N4-amine), N,N'-bis(3-aminopropyl)-1,4-diaminobutane, N5-(3-aminopropyl)-2-methyl-1,5-pentanediamine, N3-(3-aminopentyl)-1,3-pentanediamine, N5-(3-amino-1-ethylpropyl)-2-methyl-1,5-pentanediamine or N,N'-bis(3-amino-1-ethylpropyl)-2-methyl-1,5-pentanediamine.

v) Polyamines with one primary and at least one secondary amino group of which the following examples may be mentioned: N-butyl-1,2-ethanediamine; N-hexyl-1,2-ethanediamine; N-(2-ethylhexyl)-1,2-ethanediamine; N-cyclohexyl-1,2-ethanediamine; 4-aminomethyl-piperidine; N-(2-aminoethyl)piperazine; N-methyl-1,3-propanediamine; N-butyl-1,3-propanediamine; N-(2-ethylhexyl)-1,3-propanediamine; N-cyclohexyl-1,3-propanediamine; 3-methylamino-1-pentylamine; 3-ethylamino-1-pentylamine; 3-cyclohexylamino-1-pentylamine; fatty diamines such as N-cocoalkyl-1,3-propanediamine; products from the Michael-type addition reaction of primary aliphatic diamines with acrylonitrile, maleic or fumaric acid diesters, citraconic acid diesters, acrylic and methacrylic acid esters, acrylic and methacrylic acid amides and itaconic acid diesters, reacted in a 1:1 molar ratio; products from the partial reductive alkylation of primary polyamines with aldehydes or ketones, especially N-monoalkylation products of the previously mentioned polyamines with two primary amine groups and in particular of 1,6-hexanediamine, 1,5-diamino-2-methylpentane, 1,3-bis(aminomethyl)cyclohexane, 1,4-bis(aminomethyl)cyclohexane, 1,3-bis(aminomethyl)benzene, BHMT, DETA, TETA, TEPA, DPTA, N3-amine and N4-amine, wherein preferred alkyl groups are benzyl, isobutyl, hexyl and 2-ethylhexyl; and, partially styrenated polyamines such as those commercially available as Gaskamine® 240 (from Mitsubishi Gas Chemical).

vi) Secondary diamines and, in particular, N,N'-dialkylation products of the previously mentioned polyamines with two primary amine groups, especially N,N'-dialkylation products of 1,6-hexanediamine, 1,5-diamino-2-methylpentane, 1,3-bis(aminomethyl)cyclohexane, 1,4-bis(aminomethyl)-cyclohexane, 1,3-bis(aminomethyl)benzene, BHMT, DETA, TETA, TEPA, DPTA, N3-amine or N4-amine, wherein preferred alkyl groups are 2-phenylethyl, benzyl, isobutyl, hexyl and 2-ethylhexyl.

vii) Aromatic polyamines of which mention may be made of: m- and p-phenylenediamine; 4,4'-, 2,4' and 2,2'-diaminodiphenylmethane; 3,3'-dichloro-4,4'-diaminodiphenylmethane (MOCA); 2,4- and 2,6-tolylenediamine; mixtures of 3,5-dimethylthio-2,4- and -2,6-tolylenediamine (available as Ethacure® 300 from Albermarle); mixtures of 3,5-diethyl-2,4- and -2,6-tolylene diamine (DETDA); 3,3',5,5'-tetraethyl-4,4'-diaminodiphenylmethane (M-DEA); 3,3',5,5'-tetraethyl-2,2'-dichloro-4,4'-diaminodiphenylmethane (M-CDEA); 3,3'-diisopropyl-5,5'-dimethyl-4,4'-diaminodiphenylmethane (M-MIPA); 3,3',5,5'-tetraisopropyl-4,4'-diaminodiphenylmethane (M-DIPA); 4,4'-diamino diphenylsulfone (DDS); 4-amino-N-(4-aminophenyl)benzenesulfonamide; 5,5'-methylenedianthranilic acid; dimethyl-(5,5'-methylenedianthranilate); 1,3-propylene-bis(4-aminobenzoate); 1,4-butylene-bis(4-aminobenzoate); polytetramethylene oxide-bis(4-aminobenzoate) (available as Versalink® from Air Products); 1,2-bis(2-aminophenylthio)ethane, 2-methylpropyl-(4-chloro-3,5-diaminobenzoate); and, tert.butyl-(4-chloro-3,5-diaminobenzoate).

viii) Polyamidoamines of which indicative members include the reaction products of monohydric or polyhydric carboxylic acids or the esters or anhydrides thereof, —in particular dimer fatty acids—and an aliphatic, cycloaliphatic or aromatic polyamine, for instance polyalkyleneamines such as DETA or TETA. Commercially available polyamidoamines include: Versamid® 100, 125, 140 and 150 (from Cognis); Aradur® 223, 250 and 848 (from Huntsman); Euretek® 3607 and 530 (from Huntsman); and Beckopox® EH 651, EH 654, EH 655, EH 661 and EH 663 (from Cytec).

Preferred among the aforementioned polyamines having at least two primary aliphatic amine groups are: isophorone diamine (IPDA); hexamethylene diamine (HMDA); 1,3-bis(amino-methyl)cyclohexane; 1,4-bis(aminomethyl)cyclohexane; bis(4-amino-cyclohexyl)methane; bis(4-amino-3-methylcyclohexyl)methane; NBDA; and, ether group-containing polyamines with a number average molecular weight (Mn) of up to 500 g/mol. Particularly preferred among said ether group-containing polyamines are Jeffamine® D-230 and D-600 (available from Huntsman).

As noted above, the composition of the present invention may optionally comprise at least one compound which has at least two reactive mercapto-groups per molecule. Suitable mercapto-group containing compounds, which may be used alone or in combination, include but are not limited to the following:

Liquid mercaptan-terminated polysulfide polymers of which commercial examples include: Thiokol® polymers (available from Morton Thiokol), in particular the types LP-3, LP-33, LP-980, LP-23, LP-55, LP-56, LP-12, LP-31, LP-32 and LP-2 thereof; and, Thioplast® polymers (from Akzo Nobel), in particular the types G10, G112, G131, G1, G12, G21, G22, G44 and G 4.

Mercaptan-terminated polyoxyalkylene ethers, obtainable by reacting polyoxyalkylenedi- and -triols either with epichlorohydrin or with an alkylene oxide, followed by sodium hydrogen sulfide.

Mercaptan-terminated compounds in the form of polyoxyalkylene derivatives, known under the trade name of Capcure® (from Cognis), in particular the types WR-8, LOF and 3-800 thereof.

Polyesters of thiocarboxylic acids of which particular examples include: pentaerythritol tetramercapto-acetate (PETMP); trimethylolpropane trimercaptoacetate (TMPMP); glycol dimercaptoacetate; and, the esterification products of polyoxyalkylene diols and triols, ethoxylated trimethylolpropane and polyester diols with thiocarboxylic acids such as thioglycolic acid and 2- or 3-mercaptopropionic acid.

2,4,6-trimercapto-1,3,5-triazine, 2,2'-(ethylenedioxy)-diethanethiol (triethylene glycol dimercaptan) and/or ethanedithiol.

A preference for the use of polyesters of thiocarboxylic acids and in particular for the use of at least one of pentaerythritol tetramercapto-acetate (PETMP), trimethylolpropane trimercaptoacetate (TMPMP) and glycol dimercaptoacetate is acknowledged.

When formulating the curable composition, it is preferred that the composition in toto be characterized by a molar ratio of epoxide-reactive groups to epoxide groups from 0.95:1 to 1.5:1, for example from 0.95:1 to 1.1:1. Notably, the molar ratio of epoxide-reactive groups to epoxide groups of 1:1 is included within these stated ranges and itself represents a highly preferred molar ratio.

f) Additives and Adjunct Ingredients

Said compositions obtained in the present invention will typically further comprise adjuvants and additives that can impart improved properties to these compositions. For instance, the adjuvants and additives may impart one or more of: improved elastic properties; improved elastic recovery; longer enabled processing time; faster curing time; and, lower residual tack. Included among such adjuvants and additives—which independently of one another may be included in single components or both components of a two (2K) component composition—are catalysts, plasticizers, stabilizers including UV stabilizers, antioxidants, tougheners, fillers, reactive diluents, drying agents, adhesion promoters, fungicides, flame retardants, rheological adjuvants, color pigments or color pastes, and/or optionally also, to a small extent, non-reactive diluents.

For completeness, it is noted that in general adjunct materials and additives which contain epoxide-reactive groups will be blended into the hardener component of a two (2K) component composition. Materials that contain epoxide groups or which are reactive with the hardener(s) are generally formulated into the epoxide-containing component of a two (2K) component composition. Unreactive materials may be formulated into either or both of the A and B components.

Suitable catalysts are substances that promote the reaction between the epoxide groups and the epoxide-reactive groups, for instance the reaction between the amine groups and the epoxide groups. A specific example relates to the use of an amine catalyst which functions by de-protonation of reactive thiol (—SH) groups present to thiolate (—S"), which thiolate reacts with epoxide groups by nucleophilic ring opening polymerization.

Without intention to the limit the catalysts used in the present invention, mention may be made of the following suitable catalysts: i) acids or compounds hydrolyzable to acids, in particular a) organic carboxylic acids, such as acetic acid, benzoic acid, salicylic acid, 2-nitrobenzoic acid and lactic acid; b) organic sulfonic acids, such as methanesulfonic acid, p-toluenesulfonic acid and 4-dodecylbenzenesulfonic acid; c) sulfonic acid esters; d) inorganic acids, such as phosphoric acid; e) Lewis acid compounds, such as $BF_3$ amine complexes, $SbF_6$ sulfonium compounds, bis-arene iron complexes; f) Bronsted acid compounds, such as pentafluoroantimonic acid complexes; and, e) mixtures of the aforementioned acids and acid esters; ii) tertiary amines, such as 1,4-diazabicyclo[2.2.2]octane, benzyldimethylamine, α-methylbenzyl dimethylamine, triethanolamine, dimethylamino propylamine, imidazoles—including N-methylimidazole, N-vinylimidazole and 1,2-dimethylimidazole— and salts of such tertiary amines; iii) quaternary ammonium salts, such as benzyltrimethyl ammonium chloride; iv) amidines, such as 1,8-diazabicyclo[5.4.0]undec-7-ene; v) guanidines, such as 1,1,3,3-tetramethylguanidine; vi) phenols, in particular bisphenols; vii) phenol resins; viii) Mannich bases; and, ix) phosphites, such as di- and triphenylphosphites.

In an embodiment, an amine catalyst for the curing a composition based on the epoxy resin may be photobase generator: upon exposure to UV radiation—typically in the wavelength from 320 to 420 nm—said photobase generator releases an amine, which catalyzes the addition of the epoxide reactive groups to the epoxide. The photobase generator is not specifically limited so long as it generates an amine directly or indirectly with light irradiation. However, suitable photobase generators which may be mentioned include: benzyl carbamates; benzoin carbamates; o-carbamoylhydroxyamines; O-carbamoyloximes; aromatic sulfonamides; alpha-lactams; N-(2-allylethenyl)amides; arylazide compounds, N-arylformamides, and 4-(ortho-nitrophenyl) dihydropyridines.

For completeness, the preparation of photobase generator compounds is known in the art and instructive references include: J. Cameron et al., J. Am. Chem. Soc, Vol. 113, No. 11, 4303-4313 (1991); J. Cameron et al., J. Polym. Mater. Sci. Eng., 64, 55 (1991); J. Cameron, et al., J. Org. Chem., 55, 5919-5922 (1990); and, U.S. Pat. No. 5,650,261 (Winkel). Moreover, photobase generators are further described in: M. Shirai et al. *Photochemical Reactions of Quatenary Ammonium Dithiocarbamates as Photobase Generators and Their Use in The Photoinitiated Thermal Crosslinking of Poly(gycidylmethacrylate)*, Journal of Polymer Science, Part A: Polymer Chemistry, Vol. 39, pp. 1329-1341 (2001); and, M. Shirai et al., *Photoacid and photobase generators: chemistry and applications to polymeric materials*, Progress in Polymer Science, Vol. 21, pp. 1-45, XP-002299394, 1996.

In an alternative embodiment, an acid catalyst may be selected from photoacid generators (PAGs): upon irradiation with light energy, ionic photoacid generators undergo a fragmentation reaction and release one or more molecules of Lewis or Bronsted acid that catalyze the ring opening and addition of the pendent epoxide groups to form a crosslink. Useful photoacid generators are thermally stable, do not undergo thermally induced reactions with the forming copolymer and are readily dissolved or dispersed in the curable compositions. Photoacid generators are known in the art and instructive reference may be made to: K. Dietliker, *Chemistry and Technology of UV and EB Formulation for Coatings, Inks and Paints*, Vol. III, SITA Technology Ltd., London (1991); and, Kirk-Othmer *Encyclopedia of Chemical Technology*, 4.Sup.Th Edition, Supplement Volume, John Wiley and Sons, New York, pp 253-255.

Exemplary cations which may be used as the cationic portion of the ionic PAG of the invention include organic onium cations such as those described in U.S. Pat. Nos. 4,250,311, 3,113,708, 4,069,055, 4,216,288, 5,084,586, 5,124,417, and, U.S. Pat. No. 5,554,664. The references specifically encompass aliphatic or aromatic Group IVA and VIIA (CAS version) centered onium salts, with a preference being noted for I-, S-, P-, Se- N- and C-centered onium salts, such as those selected from sulfoxonium, iodonium, sulfonium, selenonium, pyridinium, carbonium and phosphonium.

As is known in the art, the nature of the counter-anion in the ionic photoacid generator (PAG) can influence the rate and extent of cationic addition polymerization of the epoxide groups. For illustration, Crivello et al. Chem. Mater., 4, 692, (1992) reports that the order of reactivity among commonly used nucleophilic anions is $SbF_6^->AsF_6^->PF_6^->BF_4^-$. The influence of the anion on reactivity has been ascribed to three principle factors which the skilled artisan should compensate for in the present invention: (1) the acidity of the protonic or Lewis acid generated; (2) the degree of ion-pair separation in the propagating cationic chain; and, (3) the susceptibility of the anions to fluoride abstraction and consequent chain termination.

It is not precluded that the compositions of the present invention include alternative photoinitiator compounds to the photobase generator and photoacid generator compounds mentioned herein above, which photoinitiator compound(s) would initiate the polymerization or hardening of the compositions upon irradiation with actinic radiation. It is noted that photo-polymerizable compositions of the present invention can be cationically polymerizable or free-radically polymerizable: whilst epoxy groups are cationically active, the election of a free-radical polymerization mechanism imposes the requirement that the composition must contain a compound possessing a free-radically active, unsaturated group such as an acrylate compound, a (meth)acrylate compound, an epoxy-functional acrylate, an epoxy functional (meth)acrylate or a combination thereof. Applying that election, the preferred photoinitiators would be photoactive compounds that undergo a Norrish I cleavage to generate free radicals that can initiate by addition to the acrylic double bonds.

In toto photoinitiators should be present in the photo-polymerizable composition in amount of from 0.1 to 1.0 parts by weight based on 100 parts of the reactant compounds.

The use of a photoinitiator—and also the photobase generator and photoacid generators mentioned herein above—may produce residue compounds from the photochemical reaction. The residues may be detected by conventional analytical techniques such as: infrared, ultraviolet and NMR spectroscopy; gas or liquid chromatography; and, mass spectroscopy. Thus, the present invention may comprise cured (epoxy) matrix copolymers and detectable amounts of residues from a photobase/acid generator. Such residues are present in small amounts and do not normally interfere with the desired physiochemical properties of the product.

Without intention to limit the present invention, a mixture comprising one or more photoinitiators may be irradiated with activating radiation to polymerize the monomeric component(s). The purpose of the irradiation is to generate the active species from the photoinitiator which initiates the cure reactions. Once that species is generated, the cure chemistry is subject to the same rules of thermodynamics as any chemical reaction: the reaction rate may be accelerated by heat. The practice of using thermal treatments to enhance the cationic UV cure of monomers is generally known in the art, with an illustrative instructive reference being Crivello et al., "*Dual Photo- and thermally initiated cationic polymerization of epoxy monomers*," Journal of Polymer Science A, Polymer Chemistry., Vol. 44, Issue: 23, pp. 6750-6764, (Dec. 1, 2006).

As would be recognized by the skilled artisan, photosensitizers can be incorporated into the compositions to improve the efficiency with which any photoinitiators present use the energy delivered. Photosensitizers are typically used in an amount of from 5 to 25 wt. %, based on the weight of the photoinitiator.

A "plasticize&" for the purposes of this invention is a substance that decreases the viscosity of the composition and thus facilitates its processability. Herein the plasticizer may constitute up to 10 wt. % or up to 5 wt. %, based on the total weight of the composition, and is preferably selected from the group consisting of: polydimethylsiloxanes (PDMS); diurethanes; ethers of monofunctional, linear or branched C4-C16 alcohols, such as Cetiol OE (obtainable from Cognis Deutschland GmbH, Dusseldorf); esters of abietic acid, butyric acid, thiobutyric acid, acetic acid, propionic acid esters and citric acid; esters based on nitrocellulose and polyvinyl acetate; fatty acid esters; dicarboxylic acid esters; esters of OH-group-carrying or epoxidized fatty acids; glycolic acid esters; benzoic acid esters; phosphoric acid esters; sulfonic acid esters; trimellitic acid esters; epoxidized plasticizers; polyether plasticizers, such as endcapped polyethylene or polypropylene glycols; polystyrene; hydrocarbon plasticizers; chlorinated paraffin; and, mixtures thereof. It is noted that, in principle, phthalic acid esters can be used as the plasticizer but these are not preferred due to their toxicological potential. It is preferred that the plasticizer comprises or consists of one or more polydimethylsiloxane (PDMS).

"Stabilizers" for purposes of this invention are to be understood as antioxidants, UV stabilizers or hydrolysis stabilizers. Herein stabilizers may constitute in toto up to 10 wt. % or up to 5 wt. %, based on the total weight of the composition. Standard commercial examples of stabilizers suitable for use herein include: sterically hindered phenols; thioethers; benzotriazoles; benzophenones; benzoates; cyanoacrylates; acrylates; amines of the hindered amine light stabilizer (HALS) type; phosphorus; sulfur; and, mixtures thereof.

Those compositions of the present invention may optionally contain a toughening rubber in the form of in the form of core-shell particles dispersed in the epoxy resin matrix. The term "core shell rubber" or CSR is being employed in accordance with its standard meaning in the art as denoting a rubber particle core formed by a polymer comprising an elastomeric or rubbery polymer as a main ingredient and a shell layer formed by a polymer which is graft polymerized onto the core. The shell layer partially or entirely covers the surface of the rubber particle core in the graft polymerization process. By weight, the core should constitute at least 50 wt. % of the core-shell rubber particle.

The polymeric material of the core should have a glass transition temperature ($T_g$) of no greater than 0° C. and preferably a glass transition temperature ($T_g$) of −20° C. or lower, more preferably −40° C. or lower and even more preferably −60° C. or lower. The polymer of the shell is non-elastomeric, thermoplastic or thermoset polymer having a glass transition temperature ($T_g$) of greater than room temperature, preferably greater than 30° C. and more preferably greater than 50° C.

Without intention to limit the invention, the core may be comprised of: a diene homopolymer, for example, a homopolymer of butadiene or isoprene; a diene copolymer, for example a copolymer of butadiene or isoprene with one or more ethylenically unsaturated monomers, such as vinyl aromatic monomers, (meth)acrylonitrile or (meth)acrylates; polymers based on (meth)acrylic acid ester monomers, such as polybutylacrylate; and, polysiloxane elastomers such as polydimethylsiloxane and crosslinked polydimethylsiloxane.

Similarly without intention to limit the present invention, the shell may be comprised of a polymer or copolymer of one or more monomers selected from: (meth)acrylates, such as methyl methacrylate; vinyl aromatic monomers, such as styrene; vinyl cyanides, such as acrylonitrile; unsaturated acids and anhydrides, such as acrylic acid; and, (meth) acrylamides. The polymer or copolymer used in the shell may possess acid groups that are cross-linked ionically through metal carboxylate formation, in particular through forming salts of divalent metal cations. The shell polymer or copolymer may also be covalently cross-linked by monomers having two or more double bonds per molecule.

It is preferred that any included core-shell rubber particles have an average particle size (d50) of from 10 nm to 300 nm, for example from 50 nm to 200 nm: said particle size refers to the diameter or largest dimension of a particle in a distribution of particles and is measured via dynamic light scattering.

The present application does not preclude the presence of two types of core shell rubber (CSR) particles with different particle sizes in the composition to provide a balance of key properties of the resultant cured product, including shear strength, peel strength and resin fracture toughness. In this embodiment, smaller included particles ($1^{st}$ CSR type) may have an average particle size of from 10 to 100 nm and larger included particles ($2^{nd}$ CSR type) may have an average particle size of from 120 nm to 300 nm, for example from 150 to 300 nm. The smaller core shell rubber particles should typically be employed in excess of the larger particles on a weight basis: a weight ratio of smaller CSR particles to larger CSR particles of from 3:1 to 5:1 may be employed for instance.

The core-shell rubber may be selected from commercially available products, examples of which include: Paraloid EXL 2650A, EXL 2655 and EXL2691 A, available from The Dow Chemical Company; the Kane Ace® MX series available from Kaneka Corporation, and in particular MX 120, MX 125, MX 130, MX 136, MX 551, MX553; and, METABLEN SX-006 available from Mitsubishi Rayon.

The core shell rubber particles should be included in the composition in an amount of from 0 to 10 wt. %, for example from 0 to 5 wt. % based on the total weight of the composition.

As noted, the compositions according to the present invention can additionally contain fillers. Suitable here are, for example, chalk, lime powder, precipitated and/or pyrogenic silicic acid, zeolites, bentonites, magnesium carbonate, diatomite, alumina, clay, talc, titanium oxide, iron oxide, zinc oxide, sand, quartz, flint, mica, glass powder, and other ground mineral substances. Organic fillers can also be used, in particular carbon black, graphite, wood fibers, wood flour, sawdust, cellulose, cotton, pulp, cotton, wood chips, chopped straw, chaff, ground walnut shells, and other chopped fibers. Short fibers such as glass fibers, glass filament, polyacrylonitrile, carbon fibers, Kevlar fibers, or polyethylene fibers can also be added. Aluminum powder is likewise suitable as a filler.

The pyrogenic and/or precipitated silicic acids advantageously have a BET surface area from 10 to 90 $m^2/g$. When they are used, they do not cause any additional increase in the viscosity of the composition according to the present invention, but do contribute to strengthening the cured composition.

It is likewise conceivable to use pyrogenic and/or precipitated silicic acids having a higher BET surface area, advantageously from 100 to 250 $m^2/g$, in particular from 110 to 170 $m^2/g$, as a filler: because of the greater BET surface area, the effect of strengthening the cured composition is achieved with a smaller proportion by weight of silicic acid.

Also suitable as fillers are hollow spheres having a mineral shell or a plastic shell. These can be, for example, hollow glass spheres that are obtainable commercially under the trade names Glass Bubbles®. Plastic-based hollow spheres, such as Expancel® or Dualite®, may be used and are described in EP 0 520 426 B1: they are made up of inorganic or organic substances and each have a diameter of 1 mm or less, preferably 500 μm or less.

Fillers which impart thixotropy to the composition may be preferred for many applications: such fillers are also described as rheological adjuvants, e.g. hydrogenated castor oil, fatty acid amides, or swellable plastics such as PVC.

The total amount of fillers present in the compositions of the present invention will preferably be from 0 to 30 wt. %, and more preferably from 0 to 20 wt. %, based on the total weight of the composition. The desired viscosity of the curable composition will typically be determinative of the total amount of filler added and it is submitted that in order to be readily extrudable out of a suitable dispensing apparatus—such as a tube—the curable compositions should possess a viscosity of from 3000 to 150,000, preferably from 40,000 to 80,000 mPas, or even from 50,000 to 60,000 mPas.

Having regard to component c) hereinabove, it is noted that other compounds having metal chelating properties may also be used in the compositions of the present invention to help enhance the adhesion of the cured adhesive to a substrate surface. Further, also suitable for use as adhesion promoters are the acetoacetate-functionalized modifying resins sold by King Industries under the trade name K-FLEX XM-B301. Examples of suitable pigments are titanium dioxide, iron oxides, or carbon black.

In order to enhance shelf life even further, it is often advisable to further stabilize the compositions of the present invention with respect to moisture penetration through using drying agents. A need also occasionally exists to lower the viscosity of an adhesive or sealant composition according to the present invention for specific applications, by using reactive diluent(s). The total amount of reactive diluents present will typically be up to 15 wt. %, and preferably from 1 to 5 wt. %, based on the total weight of the composition.

The presence of non-reactive diluents in the compositions of the present invention is also not precluded where this can usefully moderate the viscosities thereof. For instance, but for illustration only, the compositions may contain one or more of: xylene; 2-methoxyethanol; dimethoxyethanol; 2-ethoxyethanol; 2-propoxyethanol; 2-isopropoxyethanol; 2-butoxyethanol; 2-phenoxyethanol; 2-benzyloxyethanol; benzyl alcohol; ethylene glycol; ethylene glycol dimethyl ether; ethylene glycol diethyl ether; ethylene glycol dibutyl ether; ethylene glycol diphenyl ether; diethylene glycol; diethylene glycol-monomethyl ether; diethylene glycol-monoethyl ether; diethylene glycol-mono-n-butyl ether; diethylene glycol dimethyl ether; diethylene glycol diethyl ether; diethylene glycoldi-n-butylyl ether; propylene glycol butyl ether; propylene glycol phenyl ether; dipropylene glycol; dipropylene glycol monomethyl ether; dipropylene glycol dimethyl ether; dipropylene glycoldi-n-butyl ether; N-methylpyrrolidone; diphenylmethane; diisopropylnaphthalene; petroleum fractions such as Solvesso® products (available from Exxon); alkylphenols, such as tert-butylphenol, nonylphenol, dodecylphenol and 8,11,14-pentadecatrienylphenol; styrenated phenol; bisphenols; aromatic hydrocarbon resins especially those containing phenol groups, such as ethoxylated or propoxylated phenols; adipates; sebacates; phthalates; benzoates; organic phosphoric or sulfonic acid esters; and sulfonamides.

The above aside, it is preferred that said non-reactive diluents constitute less than 10 wt. %, in particular less than 5 wt. % or less than 2 wt. %, based on the total weight of the composition.

For completeness, the compositions of the present invention may comprise one or more monoamines, such as hexylamine and benzylamine.

Illustrative Embodiment of the Two Component Composition

In an exemplary embodiment of the present invention, the two component (2K) composition comprises:

A) a first component comprising, based on the weight of said first component:
from 20 to 80 wt. %, preferably from 30 to 70 wt. % of
  a) at least one elastomer modified epoxy resin selected from carboxyl terminated butadiene nitrile modified epoxy resins and urethane modified epoxy resins;
from 5 to 30 wt. %, preferably from 10 to 30 wt. % of
  b) at least one internally flexibilized epoxy resin which is characterized by a Shore D hardness, as measured with a durometer in accordance with ASTM D2240, of ≤45 when cured with diethylene triamine;
from 1 to 15 wt. %, preferably from 1 to 10 wt. % of
  c) at least one chelate modified epoxy resin having an epoxide equivalent weight of from 150 to 500 and which is selected from reaction products of epoxy resins and compounds containing chelating functional groups selected from: phosphorus-containing acid groups; carboxylic acid groups; sulfur-containing acid groups; amino groups; and, hydroxyl groups; and,
from 0 to 25 wt. %, preferably from 0 to 20 wt. % of
  d) at least one epoxy resin different from said resins a) to c); and, B) a second component comprising:
  e) a curative which consists of at least one compound possessing at least two epoxide reactive groups per molecule, said curative being characterized by comprising at least one phenalkamine Mannich base, wherein said two component composition is characterized in that the molar ratio of epoxide-reactive groups to epoxide groups is from 0.95:1 to 1.1:1.

This exemplary embodiment of the composition has been demonstrated to form—when cured—an effective, flexible sealant for shaped and jointed metallic components.

Methods and Applications

For the two component (2K) curable compositions, the reactive components are brought together and mixed in such a manner as to induce the hardening thereof: the reactive compounds should be mixed under sufficient shear forces to yield a homogeneous mixture. It is considered that this can be achieved without special conditions or special equipment. That said, suitable mixing devices might include: static mixing devices; magnetic stir bar apparatuses; wire whisk devices; augers; batch mixers; planetary mixers; C. W. Brabender or Banbury® style mixers; and, high shear mixers, such as blade-style blenders and rotary impellers.

For small-scale liner applications in which volumes of less than 2 liters will generally be used, the preferred packaging for the two component (2K) compositions will be side-by-side double cartridges or coaxial cartridges, in which two tubular chambers are arranged alongside one another or inside one another and are sealed with pistons: the driving of these pistons allows the components to be extruded from the cartridge, advantageously through a closely mounted static or dynamic mixer. For larger volume applications, the two components of the composition may advantageously be stored in drums or pails: in this case the two components are extruded via hydraulic presses, in particular by way of follower plates, and are supplied via pipelines to a mixing apparatus which can ensure fine and highly homogeneous mixing of the hardener and binder components. In any event, for any package it is important that the binder component be disposed with an airtight and moisture-tight seal, so that both components can be stored for a long time, ideally for 12 months or longer.

Non-limiting examples of two component dispensing apparatuses and methods that may be suitable for the present invention include those described in U.S. Pat. Nos. 6,129,244 and 8,313,006.

The two (2K) component curable compositions should broadly be formulated to exhibit an initial viscosity—determined immediately after mixing, for example, up to two minutes after mixing—of less than 200000 mPa·s, for instance less than 100000 mPa·s, at 25° C. Independently of or additional to said viscosity characteristics, the two (2K) component composition should be formulated to be bubble (foam) free upon mixing and subsequent curing. Moreover, the two component (2K) composition should further be formulated to demonstrate at least one, desirably at least two and most desirably all of the following properties: i) a long pot life, typically of at least 30 minutes and commonly of at least 60 or 120 minutes, which pot life should be understood herein to be the time after which the viscosity of a mixture at 20° C. will have risen to more than 50,000 mPas; ii) a maximum exotherm temperature of no greater than 120° C., preferably no greater than 100° C. and more preferably no greater than 80° C.; and, iii) a Shore A hardness of at least 50, preferably at 60 and more preferably at least 70 after being cured and stored for 7 days at room temperature and 50% relative humidity.

The curing of the compositions of the invention typically occurs at temperatures in the range of from −10° C. to 120° C., preferably from 0° C. to 70° C., and in particular from 20° C. to 60° C. The temperature that is suitable depends on the specific compounds present and the desired curing rate and can be determined in the individual case by the skilled artisan, using simple preliminary tests if necessary. Of course, curing at temperatures of from 10° C. to 35° C. or from 20° C. to 30° C. is especially advantageous as it obviates the requirement to substantially heat or cool the mixture from the usually prevailing ambient temperature. Where applicable, however, the temperature of the mixture formed from the respective components of a two (2K) component composition may be raised above the mixing temperature and/or the application temperature using conventional means including microwave induction.

The curable compositions according to the invention may find utility inter alia in: varnishes; inks; binding agents for fibers and/or particles; the coating of glass; the coating of mineral building materials, such as lime- and/or cement-bonded plasters, gypsum-containing surfaces, fiber cement building materials and concrete; the coating and sealing of wood and wooden materials, such as chipboard, fiber board and paper; the coating of metallic surfaces; the coating of asphalt- and bitumen-containing pavements; the coating and sealing of various plastic surfaces; and, the coating of leather and textiles.

By virtue of the fact that the compositions of the present invention are capable of creating a high binding strength in a short time, often at room temperature, the compositions are optimally used for forming composite structures by surfaceto-surface bonding of the same or different materials to one another. The binding together of wood and wooden materials and the binding together of metallic materials may be mentioned as exemplary adhesive applications of the present compositions.

It is also considered that the compositions of the present invention are suitable as pourable sealing compounds for electrical building components such as cables, fiber optics, cover strips or plugs. The sealants may serve to protect those components against the ingress of water and other contaminants, against heat exposure, temperature fluctuation and thermal shock, and against mechanical damage.

In a particularly preferred embodiment, the composition of the present invention is employed an adhesive or sealant for shaped and jointed metallic components such as those found in vehicles and, in particular, the doors, trunks, hood shields and panels of automobiles. A sealant may be employed during either the manufacture or the repair of such components and will effectively serve the functions of sealing those components and preventing the corrosion thereof.

In each of the above described applications, the compositions may applied by conventional application methods such as: brushing; roll coating using, for example, a 4-application roll equipment where the composition is solvent-free or a 2-application roll equipment for solvent-containing compositions; doctor-blade application; printing methods; and, spraying methods, including but not limited to air-atomized spray, air-assisted spray, airless spray and high-volume low-pressure spray. For coating and adhesive applications, it is recommended that the compositions be applied to a wet film thickness of from 10 to 500 µm. The application of thinner layers within this range is more economical and provides for a reduced likelihood of thick cured regions that may—for coating applications—require sanding. However, great control must be exercised in applying thinner coatings or layers so as to avoid the formation of discontinuous cured films.

For completeness, it is noted that the present invention does not preclude the preparation of epoxy adhesives in the form of "film adhesive". A pre-polymer mixture of epoxy resins, hardener, and other desired components is applied as a coating onto a polymer film substrate, rolled up and stored at a sufficiently low temperature to inhibit the chemical reactions between the components. When needed, the film adhesive is removed from the low temperature environment and applied to a metal or composite part, the backing is stripped off and the assembly completed and cured in an oven or autoclave.

The following example is illustrative of the present invention and is not intended to limit the scope of the invention in any way.

EXAMPLE

The following materials are employed in the example:

EP-49-10N: Chelate modified epoxy resin having an Epoxide equivalent weight of 220, available from Adeka Corporation EPU-17T-6: Urethane modified epoxy resin having an Epoxide equivalent weight of 270, available from Adeka Corporation NC-514S: Hydrophobic, flexible difunctional glycidyl ether epoxy resin having an Epoxide equivalent weight of 350-500, available from Cardolite LITE 3040: Phenalkamide curing agent having an amine equivalent weight of 118, available from Cardolite Components A and B as defined herein below in Table 1 were extruded from the separate cartridges in which they were disposed through a closely mounted static mixer. It was applied on steel and cured at 100° C. for 30 minutes. Lap shear strength on steel was 11.8 MPa, measured by Instron 4204 universal testing machine. Elongation of the invented sample, cured at 100° C. for 30 minutes, was 58%, measured by Instron 4466 tensile testing machine.

TABLE 1

| Ingredient | Percentage by Weight of Composition (wt. %) |
|---|---|
| Component A | |
| EPU-17T-6 | 49.3 |
| NC-514S | 14.1 |
| EP-49-10N | 7.0 |
| Component B | |
| LITE 3040 | 29.6 |

In view of the foregoing description and example, it will be apparent to those skilled in the art that equivalent modifications thereof can be made without departing from the scope of the claims.

What is claimed is:

1. A two component (2K) composition comprising:
  (A) a first component comprising:
    a) at least one elastomer modified epoxy resin having an epoxide equivalent weight of from 200 to 500 g/eq;
    b) at least one internally flexibilized epoxy resin which is characterized by a Shore D hardness, as measured with a durometer in accordance with ASTM D2240, of ≤45 when cured with diethylene triamine and having an epoxide equivalent weight of from 200 to 600 g/eq.;
    c) at least one chelate modified epoxy resin having an epoxide equivalent weight of from 150 to 500 g/eq.; and
    d) optionally at least one epoxy resin different from said resins a) to c); and,
  (B) a second component comprising:
    e) as a curative at least one compound possessing at least two epoxide reactive groups per molecule, and characterized by comprising at least one Mannich base and from 90 to 100 mol. % of said Mannich base(s); and from 0 to 10 mol. % of secondary epoxide reactive compounds.

2. The two component composition according to claim 1, wherein said elastomer modified epoxy resin is obtained by catalyzed addition reaction between the epoxide groups of an epoxy resin (E1) and the functional groups of an elastomer (F1), said functional groups being selected from: carboxy; amino; hydroxyl; epoxy; mercaptan; anhydride; and, isocyanate.

3. The two component composition according to claim 2, wherein said elastomer (F1) is a functionally-terminated diene-containing polymer (F1) selected from:
  carboxyl-terminated polybutadiene; carboxyl-terminated poly(butadiene-acrylonitrile); and, carboxyl-terminated poly(butadiene-acrylonitrile-acrylic acid).

4. The two component composition according to claim 1, wherein said elastomer modified epoxy resin a) comprises or consists of a urethane modified epoxy resin.

5. The two component composition according to claim 1, wherein said internally flexibilized epoxy resin is characterized by a Shore D hardness, as measured with a durometer in accordance with ASTM D2240, of ≤40 when cured with diethylene triamine.

6. The two component composition according to claim 1 comprising an internally flexibilized epoxy resin having the general formula (III):

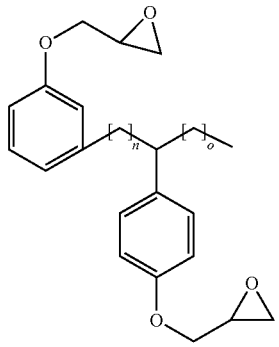

(III)

wherein n and o are the same or different and are independently selected from 1 to 10.

7. The two component composition according to claim 1, wherein said at least one chelate modified epoxy resin is selected from phosphorus-containing acid groups; carboxylic acid groups; sulfur-containing acid groups; amino groups; and hydroxyl groups.

8. The two component composition according to claim 1 comprising d) at least one epoxy resin selected from:
   glycidyl ethers of polyhydric alcohols and polyhydric phenols;
   glycidyl esters of polycarboxylic acids; and, epoxidized polyethylenically unsaturated hydrocarbons, esters, ethers and amides.

9. The two component composition according to claim 1, wherein said curative e) is characterized by containing at least one phenalkamine as said Mannich base(s).

10. A two component composition comprising:
   (A) a first component comprising:
      a) at least one elastomer modified epoxy resin;
      b) at least one internally flexibilized epoxy resin which is characterized by a Shore D hardness, as measured with a durometer in accordance with ASTM D2240, of ≤45 when cured with diethylene triamine;
      c) at least one chelate modified epoxy resin; and d) optionally at least one epoxy resin different from said resins a) to c); and,
   (B) a second component comprising:
      e) a curative which consists of at least one compound possessing at least two epoxide reactive groups per molecule, said curative being characterized by at least one Mannich base, wherein said curative e) consists of:
      from 90 to 100 mol. % of said Mannich base(s);
      from 0 to 10 mol. % of secondary epoxide reactive compounds selected from:
         i) polyamines having at least two amine hydrogens reactive toward epoxide groups; and,
         ii) mercapto compounds having at least two mercapto groups reactive toward epoxide groups.

11. A two component (2K) composition according to claim 1, said composition comprising:
   A) a first component comprising, based on the weight of said first component:
      from 20 to 80 wt. % of a) at least one elastomer modified epoxy resin;
      from 5 to 30 wt. % of b) at least one internally flexibilized epoxy resin;
      from 1 to 15 wt. % of c) at least one chelate modified epoxy resin; and
      from 0 to 25 wt. % of d) at least one epoxy resin different from said resins a) to c); and,
   B) a second component comprising:
      e) as a curative (i) at least one compound possessing at least two epoxide reactive groups per molecule, and characterized by comprising at least one Mannich base and (ii) from 90 to 100 mol. % of said Mannich base(s); from 0 to 10 mol. % of secondary epoxide reactive compounds selected from i) polyamines having at least two amine hydrogens reactive toward epoxide groups; and ii) mercapto compounds having at least two mercapto groups reactive toward epoxide groups,
   wherein said two component composition is characterized in that the molar ratio of epoxide reactive groups provided in said curative e) to epoxide groups is from 0.95:1 to 1.5:1.

12. A cured product obtained from the two component (2K) composition as defined in claim 1.

13. A cured product obtained from the two component (2K) composition as defined in claim 10.

14. A cured product obtained from the two component (2K) composition as defined in claim 11.

* * * * *